US012536775B2

(12) United States Patent
Ma et al.

(10) Patent No.: US 12,536,775 B2
(45) Date of Patent: Jan. 27, 2026

(54) TIME-SERIES IMAGE DESCRIPTION METHOD FOR DAM DEFECTS BASED ON LOCAL SELF-ATTENTION

(71) Applicants: Huaneng Lancang River Hydropower Inc, Yunnan (CN); Hohai University, Jiangsu (CN)

(72) Inventors: Hongqi Ma, Yunnan (CN); Haibin Xiao, Yunnan (CN); Yingchi Mao, Yunnan (CN); Fudong Chi, Yunnan (CN); Rongzhi Qi, Yunnan (CN); Bohui Pang, Yunnan (CN); Xiaofeng Zhou, Yunnan (CN); Hao Chen, Yunnan (CN); Jiyuan Yu, Yunnan (CN); Huan Zhao, Yunnan (CN)

(73) Assignees: Huaneng Lancang River Hydropower Inc, Kunming (CN); Hohai University, Nanjing (CN)

( * ) Notice: Subject to any disclaimer, the term of this patent is extended or adjusted under 35 U.S.C. 154(b) by 352 days.

(21) Appl. No.: 18/337,409

(22) Filed: Jun. 19, 2023

(65) Prior Publication Data

US 2023/0368500 A1    Nov. 16, 2023

Related U.S. Application Data

(63) Continuation of application No. PCT/CN2023/093153, filed on May 10, 2023.

(30) Foreign Application Priority Data

May 11, 2022    (CN) .......................... 202210513592.1

(51) Int. Cl.
*G06V 10/77*        (2022.01)
*G06T 7/00*         (2017.01)
(Continued)

(52) U.S. Cl.
CPC ........ *G06V 10/7715* (2022.01); *G06T 7/0006* (2013.01); *G06T 7/174* (2017.01);
(Continued)

(58) Field of Classification Search
CPC .. G06V 10/7715; G06V 10/82; G06V 10/774; G06T 7/174; G06T 7/0006; G06T 2207/30132; G06T 2207/30184
See application file for complete search history.

(56) References Cited

U.S. PATENT DOCUMENTS

| 2019/0149834 A1* | 5/2019 | Zhou | ..................... H04N 19/187 |
| | | | 348/473 |
| 2020/0027545 A1* | 1/2020 | Xie | ......................... G16B 40/00 |

(Continued)

FOREIGN PATENT DOCUMENTS

| CN | 109389055 A | 2/2019 |
| CN | 113392717 A | 9/2021 |

OTHER PUBLICATIONS

Authors:Honglian Sun, Yonggang Li ,Xinglong Ji ,Juiye Wang ,Xiaoxu Wu, Title:Video event description based on deep neural networks and self-attentiveness, Computer Knowledge and Technology, Nov. 30, 2020, vol. 33, No. 2020, pp. 187-189, Published by: Computer Knowledge and Technology, China.

*Primary Examiner* — Matthew C Bella
*Assistant Examiner* — Jinsu Hwang

(57) ABSTRACT

A time-series image description method for dam defects based on local self-attention mechanism is provided, including: performing frame sampling on an input time-series image of dam defect, extracting a feature sequence using a convolutional neural network and using the sequence as an input to a self-attention encoder, where the encoder includes a Transformer network based on a variable self-attention mechanism that dynamically establishes contextual feature relations for each frame; generating description text using a
(Continued)

long short term memory (LSTM) network based on a local attention mechanism to enable each word predicted to be feature related to an image frame, improving text generation accuracy by establishing a contextual dependency between image and text. A dynamic mechanism is added to the present application for calculating the global self-attention of image frames, and LSTM networks with added local attention directly establish the correspondence between image and text modal data.

9 Claims, 3 Drawing Sheets

(51) Int. Cl.
*G06T 7/174* (2017.01)
*G06V 10/774* (2022.01)
*G06V 10/82* (2022.01)

(52) U.S. Cl.
CPC ............ *G06V 10/774* (2022.01); *G06V 10/82* (2022.01); *G06T 2207/30132* (2013.01); *G06T 2207/30184* (2013.01)

(56) References Cited

U.S. PATENT DOCUMENTS

2020/0118263 A1* 4/2020 Nogami ................ G06T 7/0004
2020/0279132 A1* 9/2020 Nogami ................ G06F 18/23

* cited by examiner

TIME-SERIES IMAGE DESCRIPTION METHOD FOR DAM DEFECTS BASED ON LOCAL SELF-ATTENTION

CROSS-REFERENCE TO RELATED APPLICATIONS

This application is a continuation of PCT/CN2023/093153, filed on May 10, 2023 and claims priority of Chinese Patent Application No. 202210513592.1, filed on May 11, 2022, the entire contents of which are incorporated herein by reference.

TECHNICAL FIELD

The present application belongs to the technical field of automatic generation of time-series image description texts of dam defects, and in particular to a time-series image description method for dam defects based on local self-attention.

BACKGROUND

In fields such as construction, inspection items or inspection points where the quality does not meet the specified requirements are usually defined as defects. Different degrees of defects arise as a result of ageing materials, environmental influences, etc. with the long-term operation of hydroelectric buildings such as hydropower stations and dams. The data collected by existing devices for defect image acquisition such as drones and mobile cameras are all videos, which are compressed and coded in the process of acquisition and transmission to save costs, which prevents the model from processing the video data directly. As such, the video needs to be converted into a time-dimensional image sequence so as to enable the model to quickly extract the image features and generate the corresponding text to describe the defect content, helping users to quickly generate inspection reports and standardising the inspection process.

As for description text generation, time-series images are translated into natural language by modelling the feature relations between images and text. As images and text are two different modalities of data, their underlying features are heterogeneous and the correspondence between them is difficult to be calculated directly, which tends to cause loss of feature information and therefore affect the accuracy of the generated text. Moreover, time-series images, unlike single images, often contain a large number of image frames, from which the model fails to directly extract information related to the text.

SUMMARY

Objectives of the present application: currently, a large number of drones, mobile cameras and other equipment are used in the inspection of waterworks buildings, and the amount of video data collected is so large that it is difficult and time-consuming to find defects in them simply by manual inspection. To overcome the difficulties of the prior art for describing defects, the present application provides a time-series image description method for dam defects based on a local self-attention mechanism, which dynamically establishes contextual feature relations for image sequences, while enabling each word in a text to directly correspond to a corresponding image frame, thus effectively improving the accuracy of the generated text, and providing an intuitive textual basis for completing dam safety inspection reports with reduced labour cost.

Technical schemes: a time-series image description method for dam defects based on local self-attention mechanism, including following steps:

(1) performing frame sampling on an input time-series image, extracting a feature sequence using a convolutional neural network and using the feature sequence as an input to a self-attention encoder;

(2) encoding the feature sequence of the time-series image using a Transformer network based on a variable self-attention mechanism to dynamically establish a contextual relation for each frame; and (3) generating description text using a long short term memory (LSTM) network based on a local attention mechanism to enable each word predicted to focus on a corresponding image frame, improving text generation accuracy by establishing a contextual dependency between image and text.

Specific steps of performing frame sampling on an input time-series image and extracting a feature sequence using a convolutional neural network include:

(1.1) dividing the input time-series image into T segments of equal length without overlap, randomly selecting a frame $x_t$ from each segment to form a set of $[x_1, x_2, \ldots, x_T]$ to increase training diversity and enable the convolutional neural network to learn different instance variations of a same defect; and (1.2) using the convolutional neural network to process each sampled image frame (i.e. set $[x_1, x_2, \ldots, x_T]$), extracting a feature map as input to the self-attention encoder and recording as $F_t=[X_1, X_2, \ldots, X_t]$, where $X_t$ is a feature representation of each sampled image frame.

Specific steps of encoding the feature sequence of the time-series image using a Transformer network based on a variable self-attention mechanism include:

(2.1) obtaining a query vector q, a keyword vector k and a value vector v corresponding to each sampled frame using a linear fully-connected layer in order to facilitate a calculation of contextual feature relations for the time-series image:

$q=\text{Linear}(X)=W_Q X$ $k=\text{Linear}(X)=W_K X$ $V=\text{Linear}(X)=W_V X;$ among them, $W_Q$, $W_K$ and $W_V$ are feature matrices required to calculate each vector, and X is a feature representation of each frame of an input image sequence; vector q directs a current feature image to selectively focus on contextual features in a time-based dimension; vector k is used to calculate attention weights of a current feature map and other feature maps; and vector v is used to add information from the current feature map to a self-attention weight;

(2.2) adding a dot product of vector q and vector k to a current image block to obtain the attention weight as follows:

$$\text{Attention}(q, k, v) = \text{softmax}\left(\frac{qk^T}{\sqrt{d_k}}\right)v,$$

where $d_k$ is input vector dimension, obtained by dividing an input sequence dimension by a number of self-attention heads; vector q and vector k are dot-produced to obtain similarity scores of respective sequence elements, divided by $\sqrt{d_k}$ for normalisation to ensure a stability of gradient propagation in the convolutional neural network;

(2.3) introducing a multi-headed deformable coding structure into the Transformer network to avoid excessive parameters and therefore slow convergence of a model due to a calculation of global self-attention; enabling the model to sample and calculate attention weight for only a set of key frames around a current frame, namely by assigning a certain number of keyword vectors k to the query vector q for each element in the sequence:

$$Atten(z_q, p_q, X_t) = \sum_{m=1}^{K} W_m \left[ \sum_{k=1}^{K} A_{mqk} \cdot W'_m x_v(p_q + \Delta p_{mqk}) \right],$$

Where $p_q$ is a position reference point of the current frame, $x_v$ is a vector v corresponding to the feature map obtained above, $W_m$ and $W_m'$ are weighted learnable feature matrices, $\Delta p_{mqk}$ and $A_{mqk}$ represent a sampling offset and a self-attention weight of a $k^{th}$ sampling point in a $m^{th}$ self-attention head, respectively, and are capable of being normalized as $\Sigma_{k \in \Omega} A_{mqk}=1$, and are obtained by training through a fully-connected network and finally linearly projected into the query vector to obtain a sampled frame feature map $\hat{x}_t$ containing contextual information.

Specific steps of generating description text using the LSTM network based on the local attention mechanism include:

(3.1) $\hat{x}_t$ is a feature representation sequence for each sampled frame in the time-series image, calculating a conditional probability of generating each word by decoding the sequence to obtain a description text $\{S_n\}$ of a corresponding event:

$$\log p(S_n|x_n) = \sum_{j=1}^{t} \log p(S_n|S_n < j, s),$$

where log is set to a base of 10 and s is an original text sequence, $S_t$ represents a $t^{th}$ word of the text; the conditional probability is parameterized to facilitate calculation of attention mechanism and realization of neural network, and probability of each word is capable of being expressed as:

$p(S_{n,i}|S_n<j,s)=\text{softmax}(g(h_j))$ $h_j=f(h_{j-1},s),$ where $h_j$ is a hidden layer of a recurrent neural network, $f$ is a function calculating a hidden state at a current position based on an output of the hidden layer at a previous position and a current vector, and its output is converted into a vector with a same dimension as a vocabulary through a function g;

(3.2) introducing a context relation vector $c_t$ in a process of calculating the text, and splicing $c_t$ with a hidden layer state $h_t$ of the sequence then multiplying by a parameter matrix $w_c$ having learnable weights, and obtaining a hidden layer state with attention mechanism:

$\tilde{h}_t=\tanh(W_c[c_t \cdot h_t]);$ finally, outputting a corresponding word sequence by a Softmax function and fully-connected neural network:

$p(S_{n,i}|S_n<j,x_n)=\text{softmax}(W_s \cdot \tilde{h}_t);$ (3.3) calculating a center position $P_t$ of current attention, namely the local attention mechanism when generating each target word:

$p_t = S \cdot \text{sigmoid}(v_p^T \tanh(W_p \cdot h_t))$, and enabling output word to focus on a position of an input sequence related, where a position matrix $W_p$ and a penalty term $w_p$ are both characteristic parameters with learnable weights, S is a length of the input sequence, then an attention window corresponding to the position is $[p_t-D, p_t+D]$, where D represents a width of the window, and calculating hidden layer vectors of input and output sequences by an align function and constraining the hidden layer vectors by a Gaussian distribution to obtain the attention weight:

$$a_t(s) = \text{align}(h_t, h_s) \exp\left(-\frac{(s-p_t)^2}{2\sigma^2}\right),$$

where s represents a center position of the window; $\sigma$ is D/2, used for to normalize calculation results; finally, concatenating the contextual features (introducing the context relation vector $c_t$), the attention weight and words generated above as the input through the LSTM network, and obtaining output words at the current position by calculating through the fully-connected network and the Softmax activation function, and combining words at all positions into a complete description text.

A computer device, including a memory, a processor, and a computer program stored in the memory and runnable on the processor, where the processor executes the computer program to implement the time-series image description method for dam defects based on local self-attention mechanism.

A computer-readable storage medium, where the computer-readable storage medium stores the computer program for executing the time-series image description method for dam defects based on local self-attention mechanism.

Compared with the prior art, the present application has the following advantages.

1. In the frame sampling and feature extraction sections, random frame sampling is used to pre-process the original time-series images, effectively compressing the size of the coded sequences, while convolutional neural network-based feature extraction enables the Transformer network to focus on image visual features when adding a self-attention mechanism.

2. The Transformer network based on the variable self-attention mechanism is capable of being dynamically build up the contextual relations for each frame, avoiding the slow gradient drop in training caused by computing global feature relations, which requires long training time and large training rounds to make the model converge.

3. The LSTM network based on the local attention mechanism is capable of making each word predicted focus on the corresponding image frame when generating the description text, ensuring that no semantic information of the original time-series image is missed in the generated text and improving the accuracy of the model.

DETAILED DESCRIPTION OF THE EMBODIMENTS

The present application is further illustrated below in conjunction with specific embodiments, which should be understood to serve only to illustrate the present application and not to limit the scope of the present application, and various modifications of the present application in equivalent form by a person skilled in the art, after reading the present application, fall within the scope defined by the claims appended to the present application.

It is known that the inspection of a power station dam project is carried out by video capture devices such as Unmanned Aerial Vehicles (UAVs) and mobile cameras to capture defect time-series images. Each segment of the image may contain four types of defects, namely cracks, alkaline precipitation, water seepage and concrete spalling, and it is necessary to extract the time-series image features through the model and generate the corresponding description text, so as to reduce the time spent on manual judgement of defects and standardise the inspection process.

Figure 1:
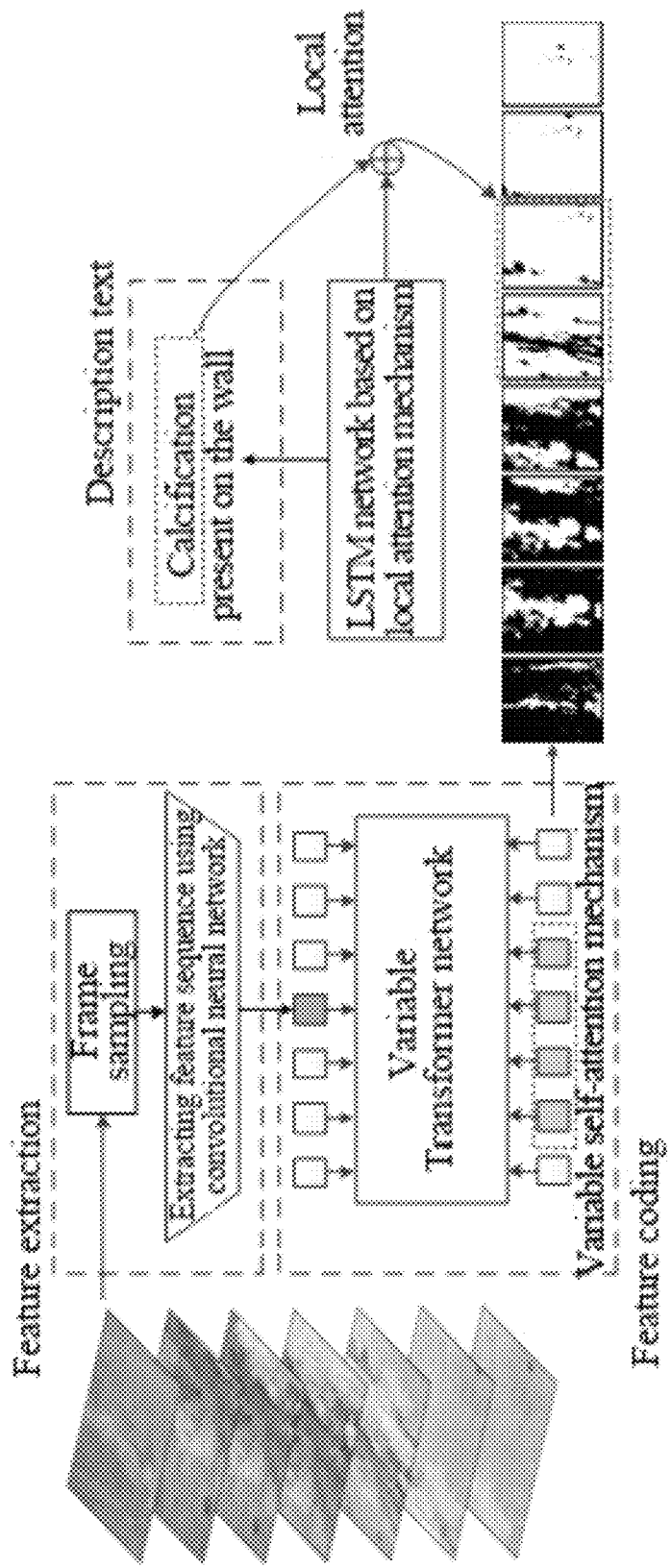
FIG. 1 shows a general framework for description of defective time-series images in a specific embodiment.
Figure 2:
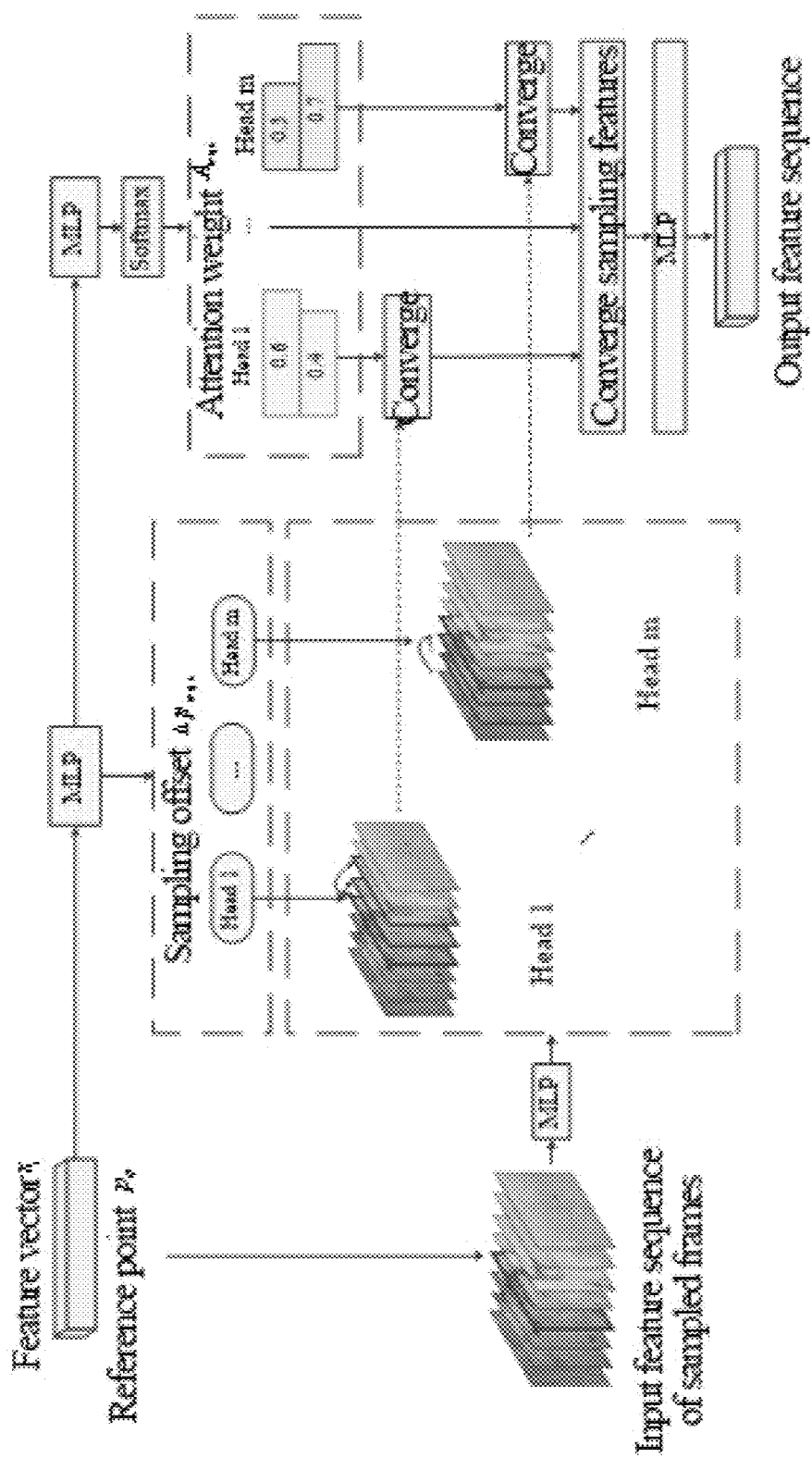
FIG. 2 shows a schematic diagram of a Transformer network structure based on a variable self-attention mechanism in a specific embodiment.
Figure 3:
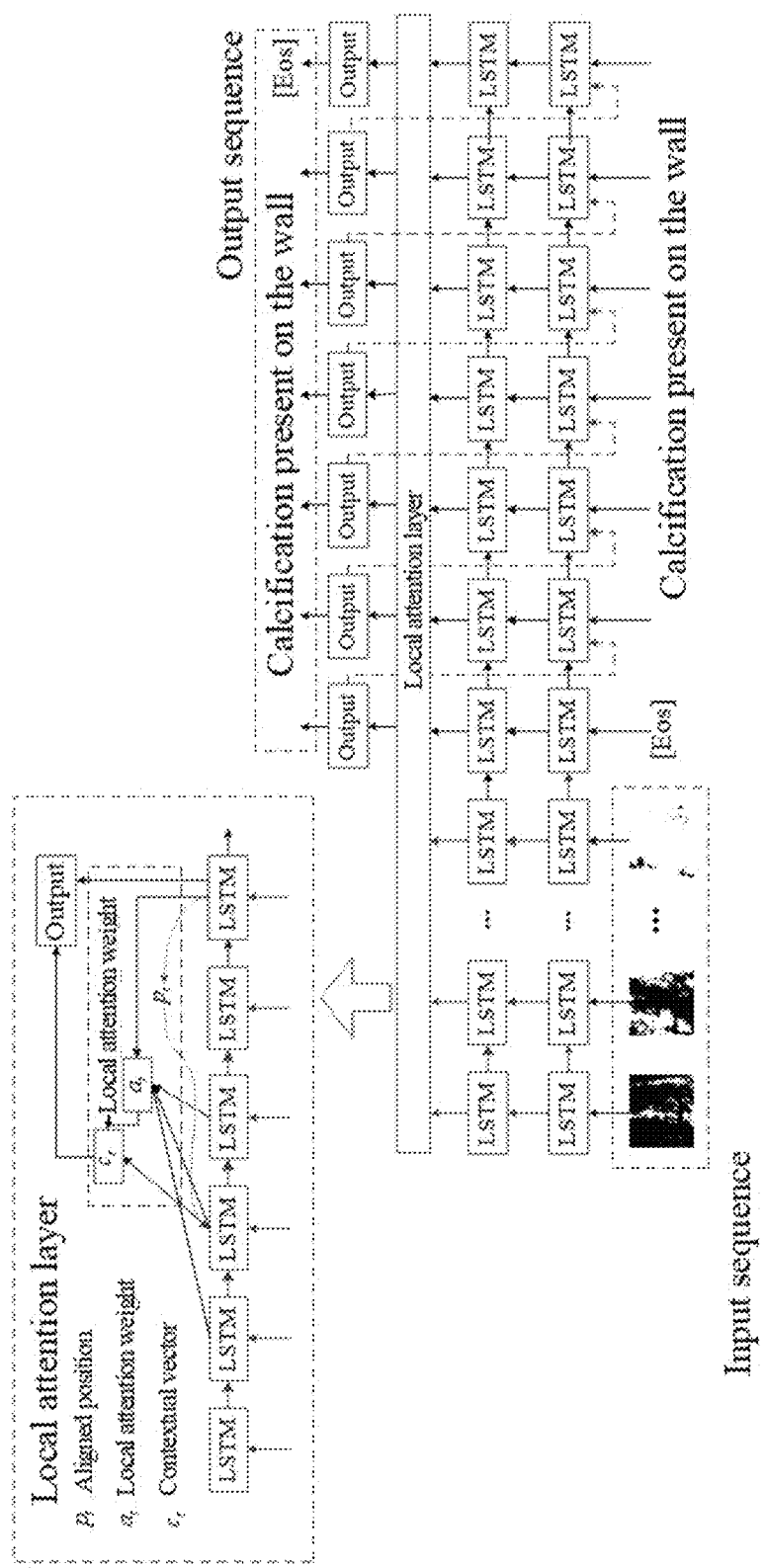
FIG. 3 shows a schematic diagram of a long short term memory (LSTM) network structure based on a local attention mechanism in a specific embodiment.

FIG. 1 shows a general workflow for a time-series image description method for dam defects based on local self-attention mechanism, with specific implementation as follows:

(1) performing frame sampling on an input time-series image, extracting a feature sequence using a convolutional neural network and using the sequence as an input to a self-attention encoder;

(1.1) dividing the input time-series image into T segments of equal length without overlap, randomly selecting a frame $x_t$ from each segment to form a set of $[x_1, x_2, \ldots, x_T]$ to increase training diversity and enable the convolutional neural network to learn different instance variations of a same defect;

(1.2) using a convolutional neural network with ResNet50 as a backbone network to process each sampled frame, extracting a feature map as input to the self-attention encoder and compressing a size to half of the original image, and recording as $F_t=[X_1, X_2, \ldots, X_t]$, where $X_t$ is a feature representation of each sampled image frame;

(2) encoding the feature sequence of the time-series image using a Transformer network based on a variable self-attention mechanism to dynamically establish a contextual relation for each frame, as shown in FIG. 2;

(2.1) obtaining a query vector q, a keyword vector k and a value vector v corresponding to each sampled frame using a linear fully-connected layer in order to facilitate a calculation of contextual feature relations for the time-series image:

$q = \text{Linear}(X) = W_Q X$ $k = \text{Linear}(X) = W_K X$ $v = \text{Linear}(X) = W_V X;$ among them, vector q is a query vector directing a current feature image to selectively focus on contextual features in a time-based dimension, vector k is a keyword vector used to calculate attention weights of a current feature map and other feature maps, and vector v is a value vector used to add information from the current feature map to a self-attention weight; the Transformer network consists of eight attention heads and a 512-dimensional fully-connected network, with the weights of each attention head calculated independently;

(2.2) adding a dot product of vector q and vector k to a current image block to obtain the attention weight as follows:

$$\text{Attention}(q, k, v) = \text{softmax}\left(\frac{qk^T}{\sqrt{d_k}}\right)v,$$

where $d_k$ is input vector dimension, obtained by dividing an input sequence dimension by a number of self-attention heads; the vector q and vector k are dot-produced to obtain similarity scores of respective sequence elements, divided by $\sqrt{d_k}$ for normalisation to ensure a stability of gradient propagation in the network;

(2.3) introducing a multi-headed deformable coding structure into the Transformer network to avoid excessive parameters and therefore slow convergence of a model due to a calculation of global self-attention; enabling the model to sample and calculate attention weight for only a set of key frames around a current frame, namely assigning a certain number of keyword vectors k to the query vector q for each element in the sequence:

$$\text{Atten}(z_q, p_q, X_t) = \sum_{m=1}^{K} W_m \left[ \sum_{k=1}^{K} A_{mqk} \cdot W'_m x_v(p_q + \Delta p_{mqk}) \right],$$

where $P_q$ is a position reference point of the current frame, $W_m$ and $W_m'$ are weighted learnable feature matrices, both are weights learned through the network with the same function and dimension size, with different weights; $\Delta p_{mqk}$ and $A_{mqk}$ represent a sampling offset and a self-attention weight of a $k^{th}$ sampling point in a $m^{th}$ self-attention head, respectively, and are capable of being normalized as $\Sigma_{k \in \Omega} A_{mqk}=1$, and are obtained by training through a fully-connected network and finally linearly projected into the query vector to output a sampled frame feature map $\hat{x}_t$ containing contextual information through a 512-dimensional fully-connected network;

(3) generating description text using a long short term memory (LSTM) network based on a local attention mechanism to enable each word predicted to focus on a corresponding image frame, improving text generation accuracy by establishing a contextual dependency between image and text, as shown in FIG. 3;

(3.1) $\hat{x}_t$ is a feature representation sequence for each sampled frame in the time-series image, calculating a conditional probability of generating each word by decoding the feature representation sequence to obtain a description text $\{S_n\}$ of a corresponding event:

$$\log p(S_n|x_n) = \sum_{j=1}^{t} \log p(S_n|S_n < j, s),$$

where $S_t$ represents a $t^{th}$ word of the text; the conditional probability is parameterized to facilitate calculation of attention mechanism and realization of neural network, and probability of each word is capable of being expressed as:

$$p(S_{n,i}|S_n <_{j,s}) = \text{softmax}(g(h_j))$$

$$h_j = f(h_{j-1}, s),$$

where $h_j$ is a hidden layer of a recurrent neural network, $f$ is a function calculating a hidden state at a current position based on an output of the hidden layer at a previous position and a current vector, and its output is converted into a vector with a same dimension as a vocabulary through a function g;

(3.2) introducing a context relation vector $c_t$ in a process of calculating the text, and splicing $c_t$ with a hidden layer state $h_t$ of the sequence then multiplying by a parameter matrix $w_c$ having learnable weights, and obtaining a hidden layer state with attention mechanism:

$$\tilde{h}_t = \tanh(W_c[c_t; h_t]);$$

finally, outputting a corresponding word sequence by a Softmax function and fully-connected neural network:

$$p(S_{n,i}|S_n <j, x_n) = \text{softmax}(W_s \tilde{h}_t);$$

(3.3) calculating a center position $P_t$ of current attention, namely the local attention mechanism when generating each target word:

$$p_t = S \cdot \text{sigmoid}(v_p^T \tanh(W_p \cdot h_t)), \text{ and}$$

enabling output word to focus on a position of an input sequence related, where a position matrix $W_p$ and a penalty term $v_p$ are both characteristic parameters with learnable weights, S is a length of the input sequence, then an attention window corresponding to the position is $[p_t-D, p_t+D]$, and calculating hidden layer vectors of input and output sequences by an align function and constraining the hidden layer vectors by a Gaussian distribution to obtain the attention weight:

$$a_t(s) = \text{align}(h_t, h_s) \exp\left(-\frac{(s-p_t)^2}{2\sigma^2}\right),$$

finally, concatenating the contextual features, the attention weight and words generated above as the input through the LSTM network, and obtaining output words at the current position by calculating through the fully-connected network and the Softmax activation function, and combining words at all positions into a complete description text. The results of the time-series image description text generation for dam defects are shown in FIG. 1. The model is capable of corresponding the calcification once to a number of frames with the strongest correlation according to the features of the input image sequence, effectively improving the accuracy of the model description text by generating keywords directly from the images.

It is obvious to those of skill in the art that the steps of the above-described time-series image description method for dam defects based on local self-attention mechanism in embodiments of the present application may be implemented with a generic computing device, they may be centralized on a single computing device or distributed on a network formed by multiple computing devices, optionally they may be implemented with program code executable by the computing device, hence, they may be stored in a storage device for execution by the computing device and, in some cases, the steps shown or described may be executed in a different order from that shown herein, or they may be separately produced as individual integrated circuit modules, or a plurality of them or the steps may be implemented as a single integrated circuit module. In this way, embodiments of the present application are not limited to any particular combination of hardware and software.

The invention claimed is:

1. A time-series image description method for dam defects based on local self-attention mechanism, comprising following steps:

(1) performing frame sampling on an input time-series image and extracting a feature sequence using a convolutional neural network;

(2) encoding the feature sequence of the time-series image using a Transformer network based on a variable self-attention mechanism to dynamically establish a contextual relation for each frame; and (3) generating description text using a long short term memory (LSTM) network based on a local attention mechanism to enable each word predicted to focus on a corresponding image frame;

wherein in step (2), specific steps of encoding the feature sequence of the time-series image using a Transformer network based on a variable self-attention mechanism comprise:

(2.1) obtaining a query vector q, a keyword vector k and a value vector v corresponding to each sampled frame using a linear fully-connected layer:

$$q = \text{Linear}(X) = W_Q X$$

$$k = \text{Linear}(X) = W_K X$$

$$v = \text{Linear}(X) = W_V X,$$

where vector q directs a current feature image to selectively focus on contextual features in a time-based dimension; vector k is used to calculate attention weights of a current feature map and other feature maps; and vector v is used to add information from the current feature map to a self-attention weight;

(2.2) adding a dot product of vector q and vector k to a current image block to obtain the attention weight as follows:

$$\text{Attention}(q, k, v) = \text{softmax}\left(\frac{qk^T}{\sqrt{d_k}}\right)v,$$

where $d_k$ is input vector dimension, obtained by dividing an input sequence dimension by a number of self-attention heads; vector q and vector k are dot-produced to obtain similarity scores of respective sequence elements, divided by $\sqrt{d_k}$ for normalisation to ensure a stability of gradient propagation in the convolutional neural network;

(2.3) introducing a multi-headed deformable coding structure into the Transformer network, enabling a model to sample and calculate attention weight for only a set of key frames around a current frame, namely assigning a certain number of keyword vectors k to the query vector q for each element in the sequence:

$$\text{Atten}(z_q, p_q, X_t) = \sum_{m=1}^{K} W_m \left[ \sum_{k=1}^{K} A_{mqk} \cdot W'_m x_v (p_q + \Delta p_{mqk}) \right],$$

where $P_q$ is a position reference point of the current frame, $W_m$ and $W_m'$ are weighted learnable feature matrices, $\Delta p_{mqk}$ and $A_{mpk}$ represent a sampling offset and a self-attention weight of a $k^{th}$ sampling point in a $m^{th}$ self-attention head, respectively, and are capable of being normalized as $\Sigma_{k \in \Omega} A_{mpk} = 1$, and are obtained by training through a fully-connected network and finally linearly projected into the query vector to obtain a sampled frame feature map $\hat{x}_t$ containing contextual information.

2. The time-series image description method for dam defects based on local self-attention mechanism according to claim 1, wherein in step (1), specific steps of performing frame sampling on an input time-series image and extracting a feature sequence using a convolutional neural network comprise:

(1.1) dividing the input time-series image into T' segments of equal length without overlap, randomly selecting a frame X, from each segment to form a set of $[x_1, x_2, \ldots, x_T]$; and (1.2) using the convolutional neural network to process each sampled image frame, extracting a feature map as input to the self-attention encoder and recording as $F_t = [X_1, X_2, \ldots, X_T]$, where X, is a feature representation of each sampled image frame.

3. The time-series image description method for dam defects based on local self-attention mechanism according to claim 1, wherein in step (3), specific steps of generating description text using the LSTM network based on the local attention mechanism comprise:

(3.1) $\hat{x}_t$ is a feature representation sequence for each sampled frame in the time-series image, calculating a conditional probability of generating each word by decoding the feature representation sequence to obtain a description text $\{S_n\}$ of a corresponding event:

$$\log p(S_n | x_n) = \sum_{j=1}^{t} \log p(S_n | S_n < j, s),$$

where $S_t$ represents a $t^{th}$ word of the text, and probability of each word is capable of being expressed as:

$p(S_{n,t} | S_n < j, s) = \text{softmax}(g(h_j))$ $h_j = f(h_{j-1}, s),$ where $h_j$ is a hidden layer of a recurrent neural network, f is a function calculating a hidden state at a current position based on an output of the hidden layer at a previous position and a current vector, with an output converted into a vector of a same dimension as a vocabulary through a function g;

(3.2) introducing a context relation vector $c_t$ in a process of calculating the text, and splicing $c_t$ with a hidden layer state $h_t$ of the sequence then multiplying by a parameter matrix $w_c$ having learnable weights, and obtaining a hidden layer state with attention mechanism:

$\tilde{h} = \tan h(W_c[c_t; h_t]),$ finally, outputting a corresponding word sequence by a Softmax function and fully-connected neural network:

$p(S_{n,t} | S_n < j, x_n) = \text{softmax}(W_s \tilde{h}_t)$ (3.3) calculating a center position $P_t$ of current attention, namely the local attention mechanism, when generating each target word:

$p_t = S \cdot \text{sigmoid}(v_p^T \tan h(W_p \cdot h_t)),$ enabling output word to focus on a position of an input sequence related, where a position matrix $W_p$ and a penalty term $v_p$ are both characteristic parameters with learnable weights, S is a length of the input sequence, then an attention window corresponding to the position is $[p_t - D, p_t + D]$, and calculating hidden layer vectors of input and output sequences by an align function and constraining the hidden layer vectors by a Gaussian distribution to obtain the attention weight:

$$a_t(s) = \text{align}(h_t, h_s) \exp\left(-\frac{(s - p_t)^2}{2\sigma^2}\right);$$

finally, concatenating the contextual features, the attention weight and words generated above as the input through the LSTM network, and obtaining output words at the current position by calculating through the fully-connected network and the Softmax activation function.

4. A computer device, comprising a memory, a processor, and a computer program stored in the memory and runnable on the processor, wherein the processor executes the computer program to implement the time-series image description method for dam defects based on local self-attention mechanism according to claim 1.

5. A computer device, comprising a memory, a processor, and a computer program stored in the memory and runnable on the processor, wherein the processor executes the computer program to implement the time-series image description method for dam defects based on local self-attention mechanism according to claim 2.

6. A computer device, comprising a memory, a processor, and a computer program stored in the memory and runnable on the processor, wherein the processor executes the computer program to implement the time-series image description method for dam defects based on local self-attention mechanism according to claim 3.

7. A computer-readable storage medium, wherein the computer-readable storage medium stores a computer program for executing the time-series image description method for dam defects based on local self-attention mechanism according to claim 1.

8. A computer-readable storage medium, wherein the computer-readable storage medium stores a computer program for executing the time-series image description method for dam defects based on local self-attention mechanism according to claim 2.

9. A computer-readable storage medium, wherein the computer-readable storage medium stores a computer program for executing the time-series image description method for dam defects based on local self-attention mechanism according to claim 3.

\* \* \* \* \*